United States Patent
Aslam et al.

(10) Patent No.: US 9,081,619 B2
(45) Date of Patent: Jul. 14, 2015

(54) PROVISIONING A WEB HOSTING RESOURCE USING A CLOUD SERVICE

(75) Inventors: Muhammad Bilal Aslam, Redmond, WA (US); Crystal L. Hoyer, Seattle, WA (US); Sayed Ibrahim Hashimi, Seattle, WA (US); Vishal R. Joshi, Redmond, WA (US); Omar Khan, Kirkland, WA (US); Jonathan Kevin Wall, Redmond, WA (US); Bill Staples, Duvall, WA (US); Bradley John Bartz, Woodinville, WA (US); Younus Aftab, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 509 days.

(21) Appl. No.: 13/173,613

(22) Filed: Jun. 30, 2011

(65) Prior Publication Data

US 2013/0007280 A1 Jan. 3, 2013

(51) Int. Cl.
*G06F 15/16* (2006.01)
*G06F 15/173* (2006.01)
*G06F 9/50* (2006.01)

(52) U.S. Cl.
CPC .................. *G06F 9/5055* (2013.01)

(58) Field of Classification Search
CPC ......... H04L 41/00; H04L 47/70; H04L 29/06; H04L 41/5083; H04L 67/1014; G06F 15/173; G06F 11/0766; G06Q 30/02; G06Q 10/06
See application file for complete search history.

(56) References Cited

U.S. PATENT DOCUMENTS

| | | | |
|---|---|---|---|
| 6,633,907 B1 | 10/2003 | Spencer et al. | |
| 2001/0037380 A1 | 11/2001 | Wall et al. | |
| 2009/0288081 A1 | 11/2009 | Delahunty et al. | |
| 2010/0106915 A1* | 4/2010 | Krishnaprasad et al. | 711/144 |
| 2010/0115585 A1 | 5/2010 | Cohen | |
| 2010/0131948 A1* | 5/2010 | Ferris | 718/1 |
| 2010/0185455 A1* | 7/2010 | Miller | 705/1.1 |
| 2010/0205302 A1 | 8/2010 | Rechterman | |
| 2010/0268764 A1* | 10/2010 | Wee et al. | 709/203 |
| 2010/0318609 A1 | 12/2010 | Lahiri et al. | |
| 2011/0093573 A1 | 4/2011 | Chen et al. | |
| 2011/0179176 A1* | 7/2011 | Ravichandran et al. | 709/226 |
| 2012/0066670 A1* | 3/2012 | McCarthy et al. | 717/169 |
| 2012/0311471 A1* | 12/2012 | Bullard et al. | 715/765 |

OTHER PUBLICATIONS

"One Click Apps", Retrieved at <<http://www.superb.net/web-hostinglapplications.php>>, Retrieved Date: Apr. 6, 2011, pp. 3.
"Anytime hosting", Retrieved at <<http://www.anytimehosting.com/whatiscloudhosting/>>, Retrieved Date: Apr. 6, 2011, pp. 3.
"Cloud Computing". Retrieved from Wikipedia on Jun. 30, 2011, <<http://en.wikipedia.org/wiki/Cloud_computing>>, 24 pgs.

* cited by examiner

*Primary Examiner* — Peling Shaw
(74) *Attorney, Agent, or Firm* — Ben Tabor; Kate Drakos; Micky Minhas

(57) ABSTRACT

A method of provisioning a Web hosting resource includes providing a cloud service. A request for a Web hosting resource is received by the cloud service, wherein the request is provided by a client. The cloud service identifies a Web host based on the received request for a Web hosting resource. The cloud service sends a request to the Web host to provision a first Web hosting resource for use by the client.

20 Claims, 5 Drawing Sheets

PROVISIONING A WEB HOSTING RESOURCE USING A CLOUD SERVICE

BACKGROUND

Deploying a Web application on a Web server is an involved process that has many potential places for error. In many modern Web applications, in addition to the code that executes on the Web server, there may also be other data and configuration changes to make when deploying an application from a development environment to a production environment. When a developer deploys a Web application to a Web server, the developer may copy the application files to the Web server, make some configuration changes, attempt to run the Web server, find configuration and other errors, attempt to troubleshoot the errors, make additional configuration changes, copy additional files, and iterate on this process until the production Web server is correctly configured and has the appropriate content. Besides potential frustration, the process of deploying a Web application on a Web server may consume a great deal of time and energy.

In addition, Web servers are often owned and controlled by third parties, such as hosting companies, and deploying a Web application on a Web server may involve obtaining a new account from the Web host or modifying an existing account. Obtaining a Web host account from a Web development tool is an onerous process that typically involves: (1) Leaving the development tool; (2) starting a Web browser and visiting the Web host's offer; (3) entering information such as a name and email address; (4) waiting for a verification email to arrive, and clicking on a URL inside the email; (5) logging in to the Web host's control panel; (6) provisioning databases and other modules inside the control panel; and (7) importing Web host settings into the Web development tool.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Obtaining a Web host account from a Web development tool can be an onerous process. One embodiment is directed to a system and method for providing an "in-tool" experience for finding and provisioning a Web host from a Web development tool. One embodiment allows a Web development tool to interact with a cloud-based service, which can interact with a Web host to provision hosting resources on behalf of the tool. Once the resource is provisioned, the tool is able to interact directly with the resource without the involvement of the cloud-based service.

One embodiment is directed to a method of provisioning a Web hosting resource, which includes providing a cloud service. A request for a Web hosting resource is received by the cloud service, wherein the request is provided by a client. The cloud service identifies a Web host based on the received request for a Web hosting resource. The cloud service sends a request to the Web host to provision a first Web hosting resource for use by the client.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

One embodiment is directed to a system and method for providing one-click Web host provisioning. In one embodiment, an "in-tool" experience is provided for finding and provisioning a Web host from a Web development tool. One embodiment allows a Web development tool to interact with a cloud-based service, which can interact with a Web host to provision hosting resources on behalf of the tool. Once the resource is provisioned, the tool is able to interact directly with the resource without the involvement of the cloud-based service. In one embodiment, all of this happens without the user leaving the Web development tool.

A "cloud" according to one embodiment refers to a collection of resources (e.g., hardware and/or software) provided and maintained by an off-site party (e.g., third party), wherein the collection of resources can be accessed by an identified user over a network. The resources can include data storage services, word processing services, and many other information technological services that are conventionally associated with personal computers or local servers.

The system and method according to one embodiment automatically matches a client (e.g., a Web development tool) to a hosting resource that matches the needs of the client, and a cloud service interacts with the host to provision a hosting resource on behalf of the client. In one embodiment, the cloud service transfers metadata, which describes the provisioned hosting resource, to the client, so the client can interact with the resource directly. The system and method according to one embodiment provides these features while maintaining trust between the client and the cloud service, and between the cloud service and the host.

Figure 1:
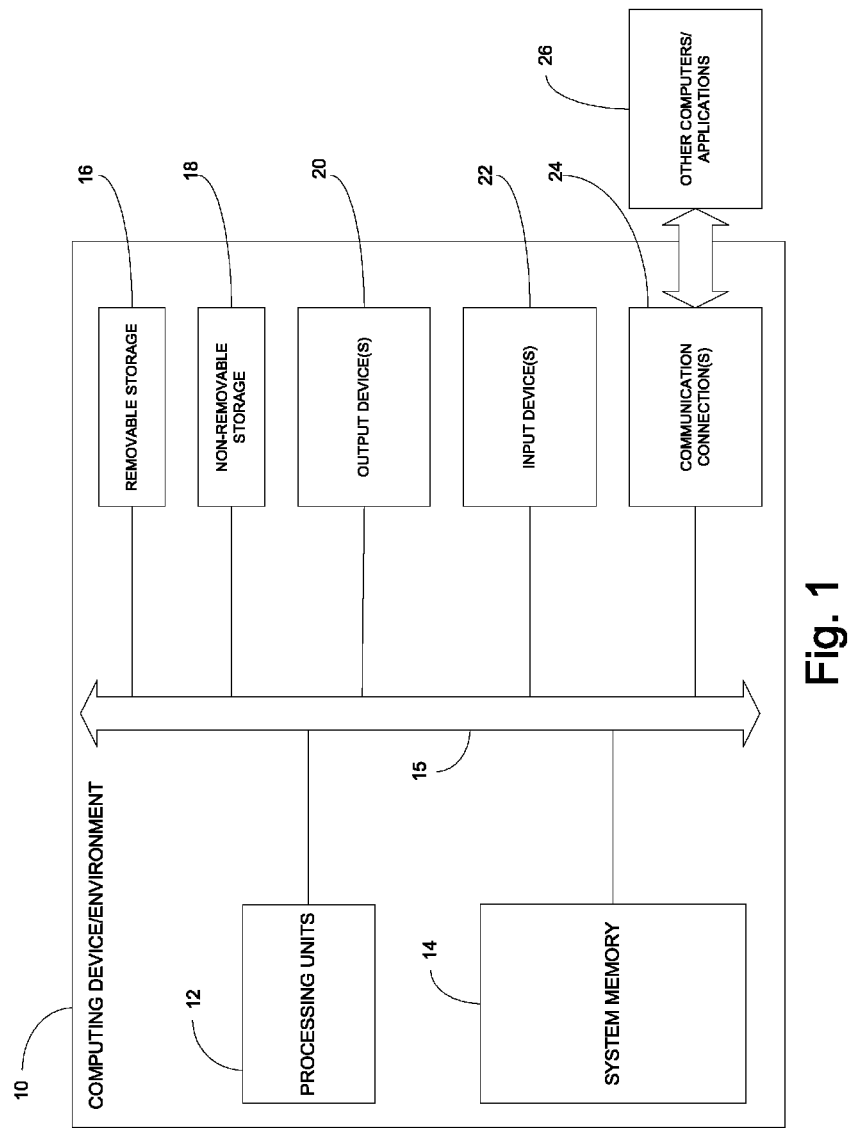
FIG. 1 is a block diagram illustrating a computing environment suitable for implementing aspects of a system for provisioning Web resources according to one embodiment.

FIG. 1 is a diagram illustrating a computing environment 10 suitable for implementing aspects of a system for provisioning Web resources according to one embodiment. In the illustrated embodiment, the computing system or computing device 10 includes one or more processing units 12 and system memory 14. Depending on the exact configuration and type of computing device, memory 14 may be volatile (such as RAM), non-volatile (such as ROM, flash memory, etc.), or some combination of the two.

Computing device 10 may also have additional features/functionality. For example, computing device 10 may also include additional storage (removable and/or non-removable) including, but not limited to, magnetic or optical disks or tape. Such additional storage is illustrated in FIG. 1 by removable storage 16 and non-removable storage 18. Computer storage media includes volatile and nonvolatile, removable and non-removable media implemented in any suitable method or technology for non-transitory storage of information such as computer readable instructions, data structures, program modules or other data. Memory 14, removable storage 16 and non-removable storage 18 are all examples of computer storage media (e.g., computer-readable storage media storing computer-executable instructions that when executed by at least one processor cause the at least one processor to perform a method). Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store the desired information and that can be accessed by computing device 10, and does not include transitory storage media. Any such non-transitory computer storage media may be part of computing device 10.

The various elements of computing device 10 are communicatively coupled together via one or more communication links 15. Computing device 10 also includes one or more communication connections 24 that allow computing device 10 to communicate with other computers/applications 26. Computing device 10 may also include input device(s) 22, such as keyboard, pointing device (e.g., mouse), pen, voice input device, touch input device, etc. Computing device 10 may also include output device(s) 20, such as a display, speakers, printer, etc.

FIG. 1 and the above discussion are intended to provide a brief general description of a suitable computing environment in which one or more embodiments may be implemented. It should be understood, however, that handheld, portable, and other computing devices of all kinds are contemplated for use. FIG. 1 thus illustrates an example of a suitable computing system environment 10 in which the embodiments may be implemented, although as made clear above, the computing system environment 10 is only one example of a suitable computing environment and is not intended to suggest any limitation as to the scope of use or functionality of the embodiments. Neither should the computing environment 10 be interpreted as having any dependency or requirement relating to any one or combination of components illustrated in the exemplary operating environment 10.

As mentioned previously, ensuring that a Web application is deployed correctly may be frustrating and time consuming. Although the term "Web application" is sometimes used herein, the teachings herein may also be applied to other types of applications without departing from the spirit or scope of aspects of the subject matter described herein. An application, as used herein, may include or be associated with one or more executable files and any data, services, or other components used or referenced by the executable files.

Figure 2:
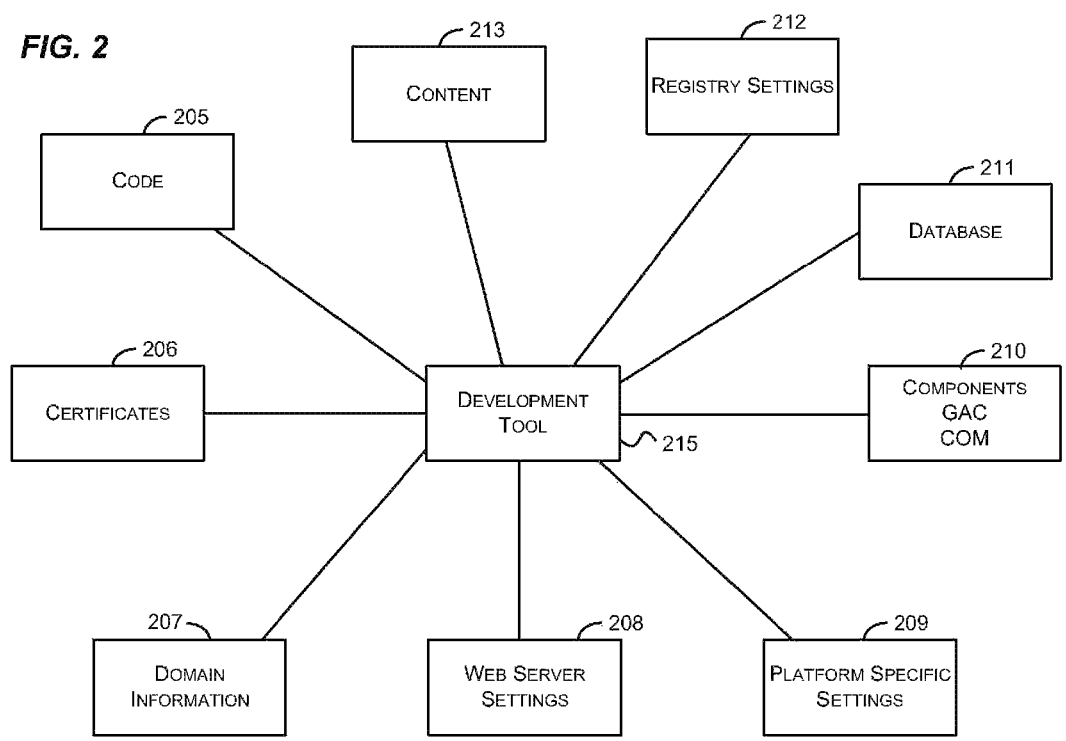
FIG. 2 is a block diagram illustrating an exemplary environment in which aspects of the subject matter described herein may be implemented according to one embodiment.

FIG. 2 is a block diagram illustrating an exemplary environment in which aspects of the subject matter described herein may be implemented according to one embodiment. In the illustrated embodiment, the environment includes code 205, certificates 206, domain information 207, Web server settings 208, platform specific settings 209, components 210, one or more databases 211, registry settings 212, content 213, a development tool 215, and may include other entities (not shown).

The code 205, certificates 206, domain information 207, Web server settings 208, platform specific settings 209, components 210, one or more databases 211, registry settings 212, content 213, and the development tool 215 are sometimes individually referred to herein as an entity or, when referring to two or more of them, as entities. The various entities may be located relatively close to each other or may be distributed around the world. An entity may be stored on a storage media such as volatile or non-volatile memory. An entity may be encoded in one or more files, data structures, and the like.

The entities illustrated in FIG. 2 represent exemplary items that may be included in or associated with a Web application. For example, the code 205 may include instructions that indicate actions a computer is to take. The code 205 may also include data, resources, variables, definitions, relationships, associations, and the like that include information other than actions the computer is to take. In an embodiment, the code may be included in a software project. A software project may include or reference code, the other information indicated above, configuration information, and the like.

The certificates 206 may include data used for security. For example, a certificate may include data usable for authentication, to control access to resources, to establish secure communication channels, for other security purposes, and the like.

The domain information 207 may include data regarding a domain associated with a Web application. For example, the domain information 207 may include a URL of a domain associated with a Web application or other information about the domain.

The Web server settings 208 may include settings data for a Web server. For example, the Web server settings 208 may indicate a default Web page associated with a URL. As another example, the Web server settings 208 may indicate an authentication method to use for authentication with a Web server. Some other exemplary settings include compression settings, directory browsing settings, error page settings, filter settings, logging settings, SSL settings, caching settings, CGI settings, other settings, and the like.

The platform specific settings 209 may include settings that are specific to a particular platform. For example, some Web servers may use the ASP.NET platform for hosting Web applications. This platform has several settings that may be included in the platform specific settings 209. Similarly, other Web servers may use other platforms for hosting Web applications. Settings particular to these other platforms including version information may be included in the platform specific settings 209.

The components 210 may include components and code that may be shared by multiple applications. For example, in some environments, the components 210 may include a global assembly cache (GAC) and component object model (COM) components.

The one or more databases 211 (hereinafter referred to as the databases 211) may comprise relational databases, object-oriented databases, hierarchical databases, network databases, other types of databases, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

An application hosted by a Web server may need to access data in the databases 211. Access as used herein may include reading data, writing data, deleting data, updating data, a combination including two or more of the above, and the like.

An application hosted by a Web server may need to have various registry settings to be able to execute correctly. These registry settings are represented by the registry settings 212.

Content associated with a Web application is represented by the content 213. Content may include images, audio, video, text, documents, Web pages, other content, and the like.

The development tool 215 comprises a component used to develop and/or deploy software. As used herein, the term component is to be read to include all or a portion of a device, a collection of one or more software modules or portions thereof, some combination of one or more software modules or portions thereof and one or more devices or portions thereof, and the like. In one exemplary embodiment, the development tool may comprise an integrated development environment (IDE) that allows a software developer to enter and update code, debug code, create and update databases, associate the code with one or more databases or other components, compile the code, create a package, do other actions, and the like.

The development tool 215 may invoke one or more processes to perform various actions. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or located on a single device.

The entities described above are not intended to be all-inclusive or exhaustive. Indeed, based on the teachings herein, those skilled in the art may recognize other entities involved with a Web application that may also be included in the environment illustrated in FIG. 2 without departing from the spirit or scope of aspects of the subject matter described herein.

When deploying a Web application to a Web server, one or more of the entities 205-213 or data derived therefrom may need to be deployed. Deploying a Web application on a Web server may involve obtaining an account from a Web host. As indicated above, obtaining a Web host account from a Web development tool can be an onerous process.

Figure 3:
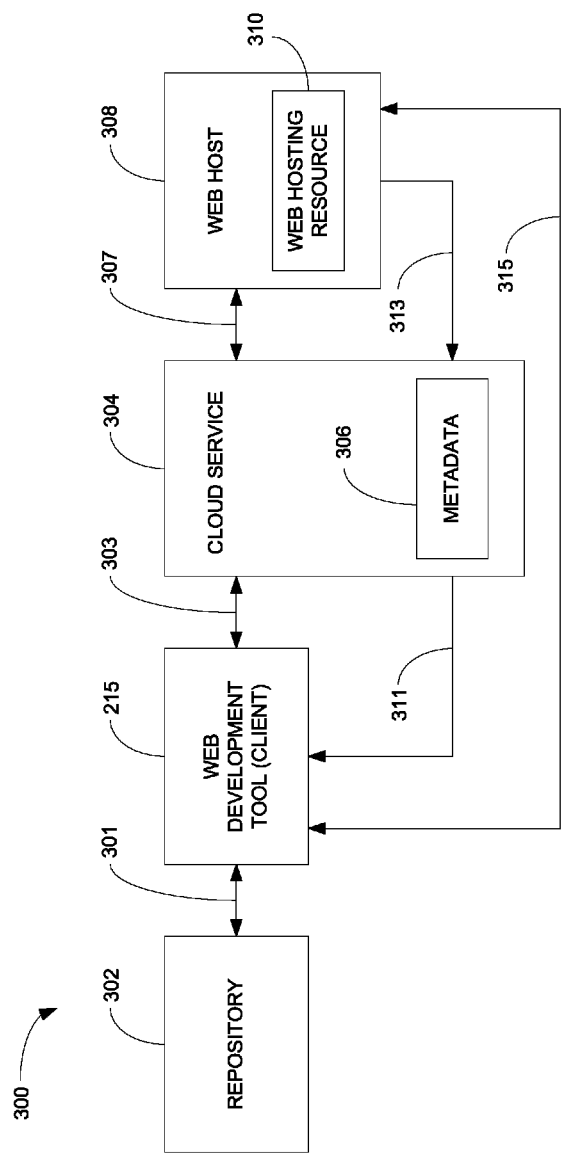
FIG. 3 is a block diagram illustrating a system for provisioning Web hosting resources and deploying a Web application according to one embodiment.

FIG. 3 is a block diagram illustrating a system 300 for provisioning Web resources and deploying a Web application according to one embodiment. System 300 includes repository 302, Web development tool (client) 215, cloud service 304, and Web host 308. Using Web development tool 215, a user signs into cloud service 304 and requests a hosting resource and provides other user information, as represented by link 303. In one embodiment, the requested hosting resource is a Web server for hosting a new website. In other embodiments, other hosting resources may be requested. A user may specify, for example, the Internet services and/or configurations they desire to purchase.

Cloud service 304 matches the user's request with a hosting resource 310 (e.g., a Web server) from a Web host 308 that fulfills the needs of the user, as represented by link 307. For example, cloud service 304 may find a Web server that is regional and offers hosting that meets the requirements of a Web application developed using tool 215.

After identifying a resource 310 that matches the user's request, the cloud service 304 requests that the Web host 308 provision the resource 310, as represented by link 307. In one embodiment, this process includes signing up for a new account or modifying an existing account with the Web host 308. In response to the provisioning request from the cloud service 304, the Web host 308 provisions the resource 310, and provides metadata 306 to cloud service 304, as represented by link 313. The metadata 306 provides information about the provisioned resource 310. In one embodiment, the metadata 306 includes two types of information: (1) information regarding how to publish to the resource 310; and (2) information regarding what services are available from the resource 310. Web host 308 reviews the information provided by cloud service 304 and initiates a provisioning process to configure the selected resource 310. In one embodiment, the provisioning process includes setting up and configuring a user account.

After receiving the metadata 306 from Web host 308, cloud service 304 forwards the metadata 306 to Web development tool 215, as represented by link 311. The metadata 306 allows the tool 215 to interact directly with the resource 310 without further involving the cloud service 304, as represented by link 315. For example, if resource 310 is a Web server, a user of development tool 215 can log in to the Web server, and after being authenticated, the user may be presented with a display that includes, for example, a list of the current settings for each of the resources to which the user has subscribed, and enables the user to modify any of the individual settings for any of the resources.

In one embodiment, Web development tool 215 interacts directly with resource 310 to deploy or publish a Web application to the resource 310. Components or elements of the Web application may be stored in repository 302 and accessed by Web development client 215, as represented by link 301. For example, the repository 302 may include modules and other software that may be installed on the resource 310. A user may interact with the resource 310 using the development tool 215, and may specify features to be installed on the resource 310. Installation of the features is facilitated in one embodiment using the metadata 306.

In one embodiment, the resource 310 includes authentication functionality to determine whether a user of development tool 215 has appropriate rights for installing modules at the resource 310. For example, a user of development tool 215 may have rights to cause the installation of certain modules, while not having rights to install other modules. If the resource 310 is maintained by a third party that rents access to the user of the development tool 215, then the rights of the user may be limited based on the rental agreement for the use of the resource 310. Such agreements may limit bandwidth or functionality.

Embodiments may be implemented where the resource 310 includes access control rules specific to a user of the development tool 215. The access control rules allow installation of one or more programmatic code units. This may be accomplished in a number of different ways. For example, in one embodiment, a user can provide appropriate authentication information such as passwords or other tokens that can be used to authenticate the user. Once the user has been authenticated, it can be determined that the user has appropriate permissions to cause the installation of the programmatic code units. Additionally, users may be limited as to what programmatic code units can be installed. For example, as described above, the resource 310 may be maintained by a third party service provider. The use of the resource 310 may be governed by a rental agreement that allows certain functionality to be implemented. So long as the user in not requesting that modules that would cause the resource 310 to provide functionality that exceeds the allowed functionality, then the requested programmatic code units will be installed on the resource 310.

In one embodiment, development tool 215 is configured to publish or deploy a Web application and entities or data derived therefrom from a source environment (e.g., repository 302) to a target environment (e.g., resource 310). Publishing refers to installing the Web application, any needed components, configuration settings, and content on the target environment. Publishing may occur in environments where the source and target are connected via a network and environments where the source and target are not connected via a network. As part of the publishing, development tool 215 may collect code and data from the entities of the source environment, derive code and data needed for deployment therefrom, and output code and data associated with the application to the resource 310.

A user of development tool 215 may indicate that simple publishing is to occur. In this case, files associated with an application to be deployed may be copied to resource 310 using FTP, HTTP, a file system command, some other transport mechanism, or the like. After the files are copied, a user may configure the resource 310 using development tool 215.

A user of development tool 215 may also indicate that a more automated publishing is to occur. In this case, a package may be created that includes the files associated with the application to be deployed, together with any configuration changes needed for the resource 310. As one example, publishing in this case may include one or more of the following: (1) Identifying components (e.g., GAC, COM, and the like); (2) identifying registry changes for the resource 310; (3) identifying Web server settings and certificates for the resource 310; (4) identifying database operations to publish to the resource 310; and (5) identifying any scripts or code to execute in configuring the resource 310.

In conjunction with identifying the above, in one embodiment, a package may be created. The package may be a self-extracting file or set of files, a set of one or more files that are not self-extracting, an in-memory representation of the files and configuration changes, and the like. The package may be structured in a manner consistent with a tool 215 capable of using the package to install the files on the resource 310 and configure the resource 310 with the configuration changes included in the package.

In the embodiment above, the package may then be published to the resource 310. Publishing the package may include installing files from the package and making configuration changes in accordance with the package. Making the configuration changes may involve installing components, making registry changes, configuring Web server settings, installing certificates, installing, populating, and/or updating data in one or more database, executing scripts or other code, and the like.

In another embodiment, the files and configuration changes may be published to resource 310 without placing them in a package. In this embodiment, tool 215 may read the files and configuration changes, contact an install agent on the resource 310, and use the install agent to install the files and complete the configuration changes to the resource 310.

Figure 4:
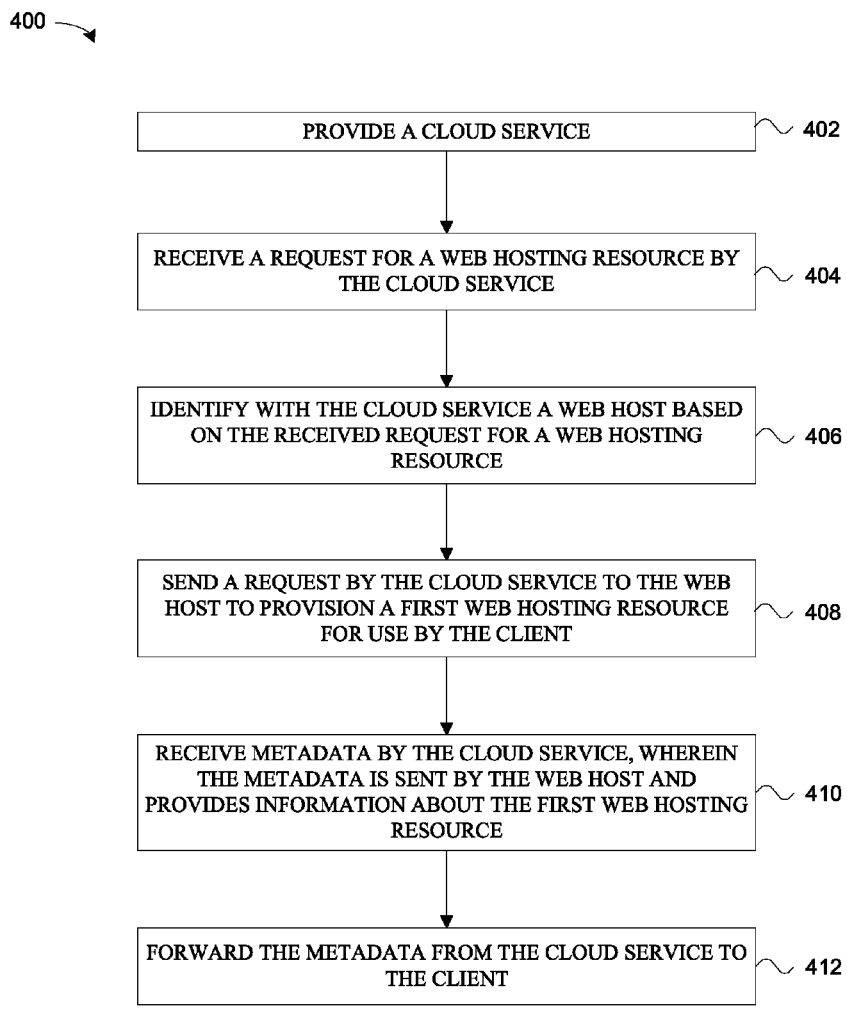
FIG. 4 is a flow diagram illustrating a method of provisioning a Web hosting resource according to one embodiment.

FIG. 4 is a flow diagram illustrating a method 400 of provisioning a Web hosting resource according to one embodiment. At 402, a cloud service 304 is provided. At 404, a request for a Web hosting resource is received by the cloud service 304, wherein the request is provided by a client 215. At 406, the cloud service 304 identifies a Web host 308 based on the received request for a Web hosting resource. At 408, the cloud service 304 sends a request to the Web host 308 to provision a first Web hosting resource 310 for use by the client 215. At 410, metadata 306 is received by the cloud service 304, wherein the metadata is sent by the Web host 308 and provides information about the first Web hosting resource 310.

At 412 in method 400, the metadata 306 is forwarded from the cloud service 304 to the client 215. In one embodiment, the metadata 306 is configured to allow the client 215 to interact directly with the first Web hosting resource 310 without involvement of the cloud service 304. The metadata 306 according to one embodiment includes information regarding how to publish an application to the first Web hosting resource 310, and further includes information regarding what services are available from the first Web hosting resource 310. The client 215 according to one embodiment is a Web development tool and is configured to deploy a Web application to the first Web hosting resource 310 based on the metadata 306. In one embodiment, the first Web hosting resource 310 comprises a Web server. The cloud service 304 according to one embodiment is configured to interact with the Web host 308 to create a new user account for online services or modify an existing user account for online services as part of a process of provisioning the first Web hosting resource 310 for use by the client 215.

Figure 5:
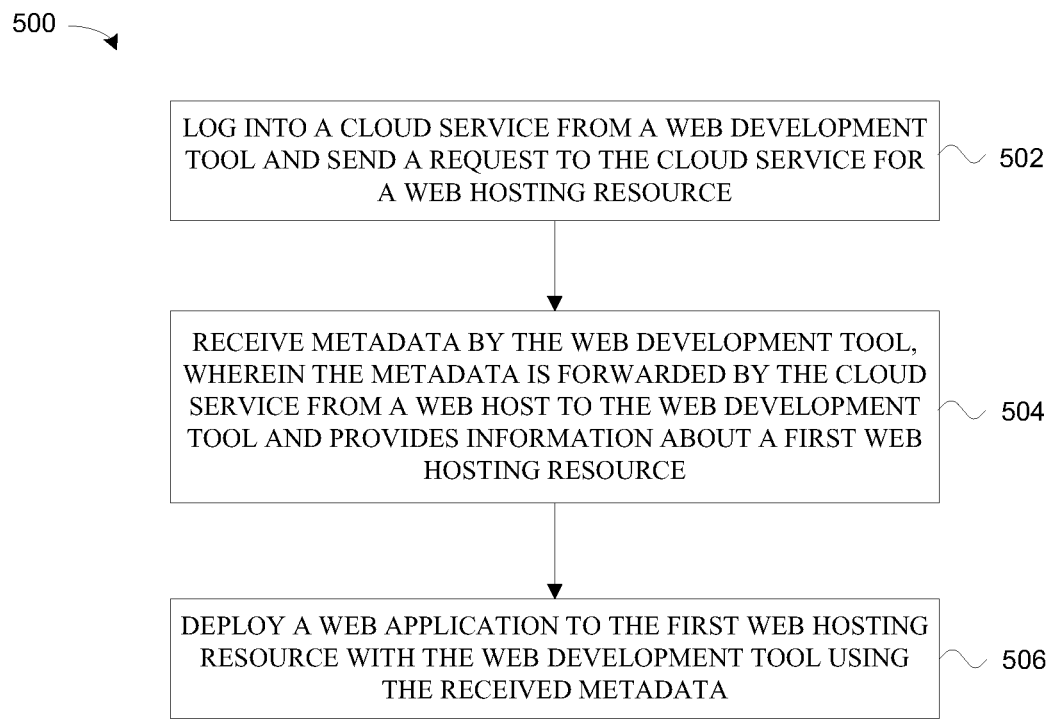
FIG. 5 is a flow diagram illustrating a method of deploying a Web application to a Web hosting resource according to one embodiment.

FIG. 5 is a flow diagram illustrating a method 500 of deploying a Web application to a Web hosting resource 310 according to one embodiment. At 502, a user logs into a cloud service 304 from a Web development tool 215 and sends a request to the cloud service 304 for a Web hosting resource. At 504, metadata 306 is received by the Web development tool 215, wherein the metadata is forwarded by the cloud service 304 from a Web host 308 to the Web development tool 215 and provides information about a first Web hosting resource 310. At 506, a Web application is deployed to the first Web hosting resource 310 with the Web development tool 215 using the received metadata 306.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of provisioning a Web hosting resource, the method comprising:
   providing a cloud service;
   receiving a request for a Web hosting resource by the cloud service, wherein the request is provided by a Web development tool for developing a Web software application;
   identifying with the cloud service a Web host based on the received request for a Web hosting resource; and
   sending a request from the cloud service to the Web host to provision a first Web hosting resource for use by the Web development tool.

2. The method of claim 1, and further comprising:
receiving metadata by the cloud service, wherein the metadata is sent by the Web host and provides information about the first Web hosting resource.

3. The method of claim 2, and further comprising:
forwarding the metadata from the cloud service to the Web development tool.

4. The method of claim 3, wherein the metadata is configured to allow the Web development tool to interact directly with the first Web hosting resource without involvement of the cloud service.

5. The method of claim 2, wherein the Web development tool is configured to deploy a Web application to the first Web hosting resource based on the metadata.

6. The method of claim 5, wherein the Web development tool comprises an integrated development environment that allows a software developer to enter code, debug the code, and compile the code.

7. The method of claim 5, wherein the first Web hosting resource comprises a Web server.

8. The method of claim 2, wherein the metadata includes information regarding how to publish an application to the first Web hosting resource.

9. The method of claim 8, wherein the metadata further includes information regarding what services are available from the first Web hosting resource.

10. The method of claim 1, wherein the cloud service is configured to interact with the Web host to create a new user account for online services or modify an existing user account for online services as part of a process of provisioning the first Web hosting resource for use by the Web development tool.

11. A computer-readable storage medium storing computer-executable instructions that when executed by at least one processor cause the at least one processor to perform a method of provisioning a Web hosting resource, the method comprising:
receiving a request for a Web hosting resource by a cloud service, wherein the request is provided by a Web development tool;
identifying with the cloud service a Web host based on the received request for a Web hosting resource; and
sending a request from the cloud service to the Web host to provision a first Web hosting resource for use by the Web development tool.

12. The computer-readable storage medium of claim 11, wherein the method further comprises:
receiving metadata by the cloud service, wherein the metadata is sent by the Web host and provides information about the first Web hosting resource.

13. The computer-readable storage medium of claim 12, wherein the method further comprises:
forwarding the metadata from the cloud service to the Web development tool.

14. The computer-readable storage medium of claim 13, wherein the metadata is configured to allow the Web development tool to interact directly with the first Web hosting resource without involvement of the cloud service.

15. The computer-readable storage medium of claim 12, wherein the Web development tool is configured to deploy a Web application to the first Web hosting resource based on the metadata.

16. The computer-readable storage medium of claim 15, wherein the first Web hosting resource comprises a Web server.

17. The computer-readable storage medium of claim 12, wherein the metadata includes information regarding how to publish an application to the first Web hosting resource.

18. The computer-readable storage medium of claim 17, wherein the metadata further includes information regarding what services are available from the first Web hosting resource.

19. The computer-readable storage medium of claim 11, wherein the cloud service is configured to interact with the Web host to create a new user account for online services or modify an existing user account for online services as part of a process of provisioning the first Web hosting resource for use by the Web development tool.

20. A method of deploying a Web application to a Web hosting resource, the method comprising:
logging into a cloud service from a Web development tool and sending a request to the cloud service for a Web hosting resource;
receiving metadata by the Web development tool, wherein the metadata is forwarded by the cloud service from a Web host to the Web development tool and provides information about a first Web hosting resource; and
deploying a Web application to the first Web hosting resource with the Web development tool using the received metadata.

* * * * *